US009093864B2

(12) United States Patent
Abe et al.

(10) Patent No.: US 9,093,864 B2
(45) Date of Patent: Jul. 28, 2015

(54) ASSEMBLED CELL CONTROL SYSTEM AND POWER SUPPLY SYSTEM COMPRISING SAME

(71) Applicant: Sanyo Electric Co., Ltd., Moriguchi, Osaka (JP)

(72) Inventors: Takayoshi Abe, Moriguchi (JP); Toshiya Iwasaki, Moriguchi (JP); Masao Yamaguchi, Moriguchi (JP)

(73) Assignee: PANASONIC INTELLECTUAL PROPERTY MANAGEMENT CO., LTD. (JP)

( * ) Notice: Subject to any disclaimer, the term of this patent is extended or adjusted under 35 U.S.C. 154(b) by 196 days.

(21) Appl. No.: 14/036,051

(22) Filed: Sep. 25, 2013

(65) Prior Publication Data

US 2014/0021924 A1 Jan. 23, 2014

Related U.S. Application Data

(63) Continuation of application No. PCT/JP2012/064317, filed on Jun. 1, 2012.

(30) Foreign Application Priority Data

Jun. 3, 2011 (JP) ................................. 2011-125508

(51) Int. Cl.
*H02J 7/00* (2006.01)
*H02J 3/32* (2006.01)
*H01M 10/44* (2006.01)
*H01M 10/48* (2006.01)
*H02J 13/00* (2006.01)

(52) U.S. Cl.
CPC ................ *H02J 3/32* (2013.01); *H01M 10/44* (2013.01); *H01M 10/48* (2013.01); *H02J 13/0006* (2013.01); *Y02E 60/722* (2013.01); *Y04S 10/14* (2013.01)

(58) Field of Classification Search
CPC .......................... H01M 10/44; H02J 2007/005
USPC .......................... 320/118, 132, 134, 136, 162
See application file for complete search history.

(56) References Cited

U.S. PATENT DOCUMENTS 5,955,869 A * 9/1999 Rathmann ..................... 320/132
2002/0011820 A1 1/2002 Suzuki et al.
(Continued)

FOREIGN PATENT DOCUMENTS

CN 101882699 A 11/2010
EP 0965906 A2 12/1999
(Continued)

OTHER PUBLICATIONS

International Search Report for International Application No. PCT/JP2012/064317; Date of Mailing: Sep. 4, 2012; 3 pgs. with English Translation.
(Continued)

*Primary Examiner* — Arun Williams
*Assistant Examiner* — Aaron Piggush
(74) *Attorney, Agent, or Firm* — Cantor Colburn LLP

(57) ABSTRACT

An assembled battery control system is provided with an assembled battery composed of a plurality of rechargeable battery packs connected in series, and a control unit for controlling the assembled battery. Each battery pack has a discharge unit. The control unit confirms the open-circuit voltage of each battery pack in the assembled battery after the assembled battery has been fully charged, determines a target voltage on the basis of the open-circuit voltage confirmation results for each battery pack in the assembled battery, causes the discharge unit to discharge each battery pack in the assembled battery that has an open-circuit voltage greater than the target voltage until the open-circuit voltage of each of said battery packs reaches the target voltage, fully charges the assembled battery again, discharges the assembled battery until a first predetermined level has been reached, and learns the capacity of each battery pack in the assembled battery.

7 Claims, 16 Drawing Sheets

(56) References Cited

U.S. PATENT DOCUMENTS

| | | |
|---|---|---|
| 2009/0027009 A1 | 1/2009 | Sivertsen |
| 2009/0167248 A1 | 7/2009 | Murao et al. |
| 2010/0134070 A1 | 6/2010 | Yun et al. |
| 2012/0081075 A1* | 4/2012 | Skelton .......................... 320/116 |

FOREIGN PATENT DOCUMENTS

| | | |
|---|---|---|
| EP | 2075894 A2 | 7/2009 |
| EP | 2315336 A1 | 4/2011 |
| JP | 2000050517 A | 2/2000 |
| JP | 2007325451 A | 12/2007 |
| JP | 2009159794 A | 7/2009 |
| JP | 2009178040 A | 8/2009 |
| JP | 2010272219 A | 12/2010 |

OTHER PUBLICATIONS

Extended European Search Report corresponding to Application No. 12792646.7-1806/2717422, PCT/JP2012064317; Date of Mailing: Oct. 10, 2014.

* cited by examiner

ASSEMBLED CELL CONTROL SYSTEM AND POWER SUPPLY SYSTEM COMPRISING SAME

CROSS-REFERENCE TO RELATED APPLICATIONS

This is a continuation of International Application PCT/JP2012/064317, with an international filing date of Jun. 1, 2012, filed by applicant, the disclosure of which is hereby incorporated by reference in its entirety.

FIELD OF THE INVENTION

The present invention relates to an assembled battery control system for controlling an assembled battery composed of a plurality of rechargeable battery packs connected in series, and to a power supply system provided with said control system.

BACKGROUND

In recent years, the capacity of storage cells has increased, and power supply systems have been introduced to store power to be consumed by buildings, factories, stores, and private residences. By charging the storage cells (consuming power) in advance, these power supply systems can discharge power from the storage cells (supply power) at a predetermined time. In other words, by controlling the time at which the storage cells are charged and discharged, the time at which grid power (power supplied by a power company) is consumed can also be controlled.

The electrical utility rate for grid power usually includes both a fixed basic rate and a metered usage rate. Power companies set the basic rate so that the basic rate becomes less costly as the maximum amount of grid power consumed per unit of time becomes lower. The usage rate is also set so that the usage rate becomes less costly per unit of power at night, when less power is consumed, than during the day. Therefore, users of grid power can reduce the electrical utility rate they pay for grid power if they level out their consumption of grid power.

Therefore, a power supply system can suppress the rate for grid power by using grid power to charge storage cells during a period of time in which demand for power from users of grid power is low, or during the period of time in which the nighttime electric rate applies, and then discharging power from the storage cells, when the demand for power from users of grid power exceeds a predetermined threshold value, to compensate for the amount of demand exceeding the threshold value (the cross-hatched portion of FIG. 1).

CITED DOCUMENTS

Patent Documents

Patent Document 1: Laid-Open Patent Publication No. 2010-272219;
Patent Document 2: Laid-Open Patent Publication No. 2009-178040;
Patent Document 3: Laid-Open Patent Publication No. 2007-325451.

SUMMARY

Problem Solved by the Invention

In a power supply system, the charge and discharge voltage can be increased by using an assembled battery composed of a plurality of rechargeable battery packs connected in series, and the charge and discharge current of the entire system can be increased by connecting a plurality of assembled batteries in parallel.

Rechargeable batteries deteriorate when power is saved and used, and the full charge capacity (FCC) of these batteries is gradually reduced. Because the full charge capacity is used, for example, to determine the state of charge (SOC), which is a parameter expressing as a percentage the discharge capacity (remaining capacity) relative to the full charge capacity, it is important to grasp the full charge capacity accurately. The process for updating the full charge capacity is called capacity learning. In this process, the discharge capacity is determined by fully discharging a fully charged battery, calculating the full charge capacity, and updating the full charge capacity.

However, as an assembled battery is composed of a plurality of battery packs connected in series, when a single battery pack inside an assembled battery becomes fully charged during an attempt to fully charge the assembled battery, continued charging of the other battery packs in the assembled battery is disabled in order to avoid overcharging the fully-charged battery pack. Moreover, when a single battery pack inside an assembled battery becomes fully discharged during an attempt to fully discharge the assembled battery, continued discharging of the other battery packs in the assembled battery must be disabled in order to avoid over-discharge of the fully-discharged battery pack. Therefore, if there is a significant difference in storage capacity between a fully-discharged battery pack in the assembled battery and the other battery packs of the assembled battery that have not reached full discharge, capacity learning is performed, and the full charge capacity of each battery pack constituting the assembled battery is updated to reduce the difference in storage capacity. However, there is a problem with declining accuracy in learning the capacity of the assembled battery when such a difference in storage capacity occurs between each battery pack constituting the assembled battery.

Techniques for adjusting the voltage balance between each battery pack in an assembled battery have been disclosed in Patent Documents 1-3, but this balance adjustment is unrelated to learning the capacity of an assembled battery, as the state of each battery pack in the assembled battery cannot be confirmed when the capacity of an assembled battery is learned.

In view of this situation, it is an objective of the present invention to provide a control system for an assembled battery and a power supply system using said control system for an assembled battery that are able to improve the accuracy of capacity learning for an assembled battery composed of a plurality of rechargeable battery packs connected in series.

Means of Solving the Problem

In order to achieve the aforementioned objective, the present invention is a control system for an assembled battery provided with an assembled battery having a plurality of rechargeable battery packs connected in series, and a control unit for controlling the assembled battery. In this control system, the battery packs have a discharge unit, and the control unit confirms the open-circuit voltage for each battery pack in the assembled battery after the assembled battery has been fully charged, determines a target voltage on the basis of the open-circuit voltage confirmation results for each battery pack in the assembled battery, causes the discharge unit to discharge each battery pack in the assembled battery that has an open-circuit voltage greater than the target voltage until the open-circuit voltage has reached the target voltage, fully charges the assembled battery once again discharges the assembled battery until a first predetermined level has been reached, and learns the capacity of each battery pack in the assembled battery. At least a portion of the control unit may be incorporated into the assembled battery.

In order to achieve the aforementioned objective, the power supply system of the present invention is provided with a control system for an assembled battery having the aforementioned configuration. The power supply system is provided with a plurality of assembled batteries having the aforementioned control system for an assembled battery. In this configuration, the plurality of assembled batteries are connected in parallel. Among the plurality of assembled batteries, at least a portion of the control unit in the control system for the assembled batteries may be shared.

Effect of the Invention

In a control system for an assembled battery and a power supply system provided with the control system for an assembled battery as in the present invention, by using the discharge unit to discharge each battery pack in the assembled battery having an open-circuit voltage greater than the target voltage until the open-circuit voltage has reached the target voltage, the capacity can be learned in a state in which the variation in the amount of charge among the battery packs has been reduced. As a result, the capacity of an assembled battery composed of a plurality of rechargeable battery packs connected in series can be learned with greater accuracy.

DETAILED DESCRIPTION

The following is an explanation of an embodiment with reference to the drawings. The present invention is not limited to the embodiment described below, as the embodiment could be modified in various ways while remaining within the spirit and scope of the present invention.

Figure 1:
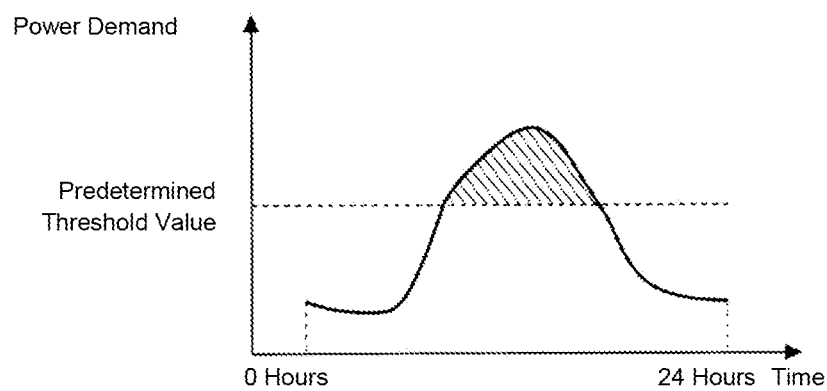
FIG. 1 is a diagram showing a typical example of the demand for power from users of grid power.
Figure 2:
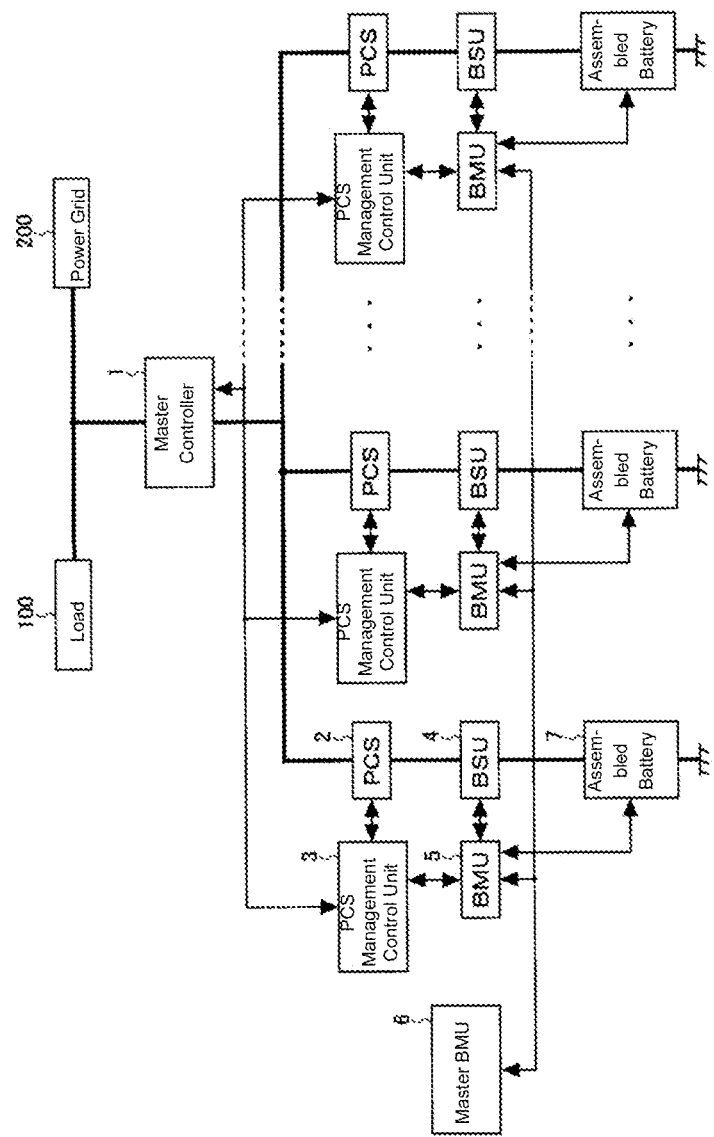
FIG. 2 is a diagram showing the schematic configuration of the power supply system in an embodiment.

FIG. 2 is a block diagram showing the schematic configuration of the power supply system in an embodiment. However, in FIG. 2, the thick lines connecting the block are power lines, and the thin lines connecting blocks are communication lines. In the present embodiment, the communication lines are used to perform wired communication which is more reliable. However, wireless communication can also be used. Communication may be performed, for example, using TCP (Transmission Control Protocol)/IP (Internet Protocol) or UDP (User Datagram Protocol)/IP (Internet Protocol).

The power supply system in the embodiment shown in FIG. 2 is provided with a master controller 1, power conditioning systems (PCS) 2, PCS management control units 3, battery switching units (BSU) 4, battery management units (BMU) 5, a master BMU 6, and assembled batteries 7. The power supply system in the embodiment shown in FIG. 2 is provided with a plurality of series which are composed of a PCS 2, a PCS management control unit 3, a BSU 4, a BMU 5 and an assembled battery 7, and each series is connected to the master controller 1 so that the assembled batteries 7 of each series are connected in parallel.

Overview of the Master Controller

The master controller 1 is connected to an external load 100 and the power grid 200. The load 100 has AC power input terminals, and the power grid 200 supplies AC power. The master controller 1 integrally monitors and controls the PCS management control unit 3 in each series. during normal operation, the master controller 1 determines the charge and discharge capacity of each series, and sends charge and discharge control commands to the PCS management control unit 3 of each series in response to said determination. When an abnormality occurs, the master controller 1 sends to the PCS management control unit 3 of the series in which the abnormality has occurred a stop command for the PCS 2, a standby command for the PCS 2, or a shutdown command for the breaker (not shown) installed near the PCS 2.

Overview of the PCS

A PCS 2 is a bidirectional AC/DC power converter, which converts AC power supplied from the power grid 200 via the master controller 1 to DC power during charging, and converts DC power supplied from the assembled battery 7 belonging to the same series via the BSU 4 belonging to the same series to AC power during discharging. Unlike the present embodiment, the PCS 2 may be changed to a bidirectional DC/DC power converter when the master controller 1 is connected to an external DC load (a load having DC power input terminals) and to a DC power source (for example, photovoltaic cells).

Overview of the PCS Management Control Unit

The PCS management control unit 3 controls the operation of the PCS 2 belonging to the same series on the basis of charge and discharge control commands sent from the master controller 1, and monitors the state of the PCS 2 belonging to the same series. When an abnormality occurs, the PCS management control unit 3 stops the PCS 2 belonging to the same series, puts the PCS 2 belonging to the same series into standby, or shuts down the breaker (not shown) installed near the PCS 2 belonging to the same series.

The PCS management control unit 3 also monitors the BMU 5 for abnormalities by periodically communicating with the BMU 5. Because abnormalities detected in the BMU 5 are included among the abnormalities mentioned above, the PCS management control unit 3 stops the PCS 2 belonging to the same series, puts the PCS 2 belonging to the same series into standby, or shuts down the breaker (not shown) installed near the PCS 2 belonging to the same series.

Overview of the BSU

The BSU 4 is a switch which is used to turn ON and OFF the electrical connection between the PCS 2 belonging to the same series and the assembled battery 7 belonging to the same series. This switch is controlled by the BMU 5 belonging to the same series. In the present embodiment, the BSU 4 is composed of a power field-effect transistor (FET), a conductor, and a breaker connected in series. When the electrical connection between the PCS 2 and the assembled battery 7 is switched from ON to OFF, the power FET serving as the electrical switch is switched from ON to OFF before the conductor and breaker serving as the mechanical switches are switched from ON to OFF. when the electrical connection between the PCS 2 and the assembled battery 7 is switched from OFF to ON, the conductor and breaker serving as the mechanical switches are switched from OFF to ON before the power FET serving as the electrical switch is switched from OFF to ON.

Overview of the BMU

The BMU 5 controls the BSU 4 belonging to the same series, and monitors the state of the BSU 4 belonging to the same series and the assembled battery 7 belonging to the same series.

The BMU 5 also sends log information related to the state of the assembled battery 7 belonging to the same series, the state of the BSU 4 belonging to the same series, its own state (BMU 5), and the state of the PCS 2 belonging to the same series to the master BMU 6. Because the BMU 5 cannot directly acquire the state of the PCS 2 belonging to the same series, the state of the PCS 2 belonging to the same series is acquired via periodic communication with the PCS management control unit 3 described above.

When an abnormality has been detected during state monitoring, the BMU 5 sends commands to the BSU 4 belonging to the same series to turn OFF the power FET, the conductor and the breaker in the BSU 4.

The BMU 5 also monitors for abnormalities in the PCS management control unit 3 by periodically communicating with the PCS management control unit 3. Because abnormalities detected in the PCS management control unit 3 are included among the abnormalities mentioned above, the BMU 5 sends commands to the BSU 4 belonging to the same series to turn OFF the power FET, the conductor and the breaker in the BSU 4.

Overview of Master BMU

The master BMU 6 integrally monitors and controls the assembled battery 7, BSU 4 and BMU 5 in each series. In other words, it collects and stores log information related to the state of the assembled battery 7, the state of the BSU 4, the state of the BMU 5, and the state of the PCS 2 sent from the BMU 5 in each series, and if necessary, sends a command to a BMU 5 to turn OFF the power FET, the conductor, and the breaker in the BSU 4 belonging to the same series as the BMU 5. For example, when the master BMU 6 has determined on the basis of log information that the number of series experiencing abnormalities exceeds a predetermined number, it sends a command to the BMU 5 of each series not experiencing an abnormality to turn OFF the power FET, the conductor, and the breaker in the BSU 4 belonging to the same series as each BMU 5 to ensure their safety.

The master BMU 6 also sends information related to charge and discharge allocation to the BMU 5 in each series so that the master controller 1 can allocate charge and discharge amounts to each series in consideration of the state of health (SOH) of each assembled battery 7.

Overview of Assembled Battery

Each assembled battery 7 is composed of fourteen battery packs connected in series. In the present embodiment, the number of battery packs connected in series is fourteen, but any other number of battery packs may be used.

Communication Between BMU and Assembled Battery Via Optical Line

The following is an explanation of communication between a BMU 5 and an assembled battery 7 via an optical line with reference to FIG. 3 through FIG. 6. In a power supply system in which the voltage of the assembled batteries 7 is from 200 V to 600 V, photocouplers can be used in an insulated communication circuit. However, when a power supply system is constructed from assembled batteries 7 having a voltage equal to or greater than 600 V, the insulation provided by photocouplers is limited with respect to conformity to global safety standards. Therefore, in the present embodiment, optical lines are used in communication between a BMU 5 and an assembled battery 7.

Figure 3:
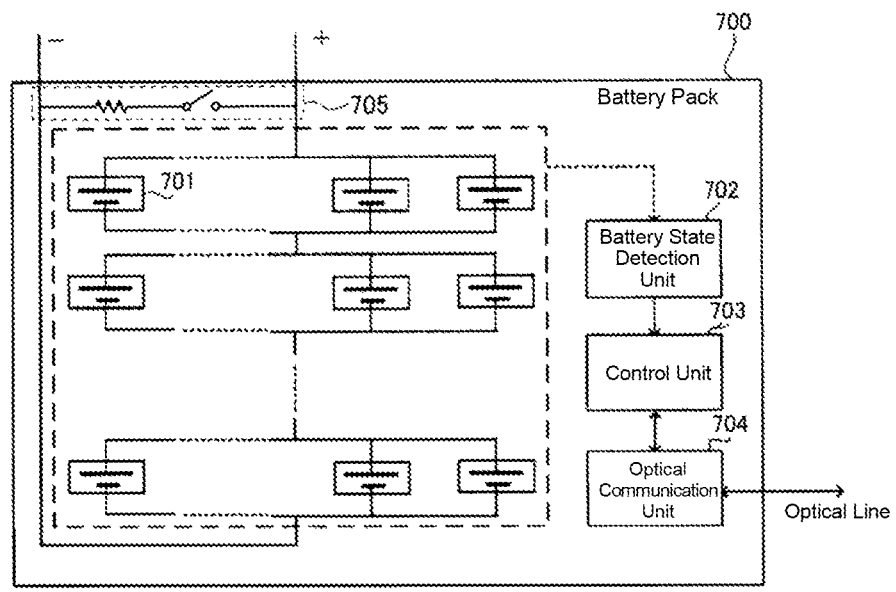
FIG. 3 is a diagram showing an example of the configuration of battery packs inside an assembled battery.

FIG. 3 is a diagram showing an example of the configuration of a battery pack 700 inside an assembled battery 7. The battery pack 700 includes a plurality of rechargeable battery cells 701, a battery state detection unit 702, a control unit 703, an optical communication unit 704, and a discharge unit 705. Rechargeable battery cells 701 such as lithium ion batteries are connected in parallel and in series. For example, twenty-four rechargeable battery cells 701 may be connected in parallel and thirteen stages of these cells connected in parallel may be connected in series. Moreover, a battery pack 701 may have just one unit of rechargeable battery cells 701 connected in parallel, or may be simply have just one rechargeable battery cell 701.

When the voltage value of each stage of rechargeable battery cells 701 connected in parallel is detected, the battery state detection unit 702 detects the current value and voltage value between the positive and negative electrodes of the battery pack 700, the SOC of the battery pack 700, and the temperature of the battery pack 700, and then sends the detection data to the control unit 703. The SOC of a battery pack 700 can be obtained from the cumulative value of the charge and discharge current to and from the battery pack 700, or by referencing an equation or table indicating the predetermined relationship between the open-circuit voltage (OCV) of the battery pack 700 and the SOC. The control unit 703 transmits the detection data obtained from the battery state detecting unit 702 as battery data via the optical communication unit 704. The optical communication unit 704 comprises an optical transmission module and an optical reception module. The discharge unit 705, which has a resistor and a switch connected to each other in series, is arranged between the positive and negative electrodes of the battery pack 700. When the switch in the discharge unit 705 is turned ON, the rechargeable battery cells 701 are discharged by the resistor in the discharge unit 705.

When an optical communication unit 704 is used for insulation, the drive power of the communication unit cannot be provided from the BMU 5 side as in the case of communication via metal. Instead, the drive power for the optical communication unit 704 is supplied from the rechargeable battery cells 701. Therefore, when communication between a BMU 5 and an assembled battery 7 is performed using an optical line as in the case of the present embodiment, the communication configuration uses the optical lines as described below. Even so, compared to communication via metal, the difference in charge amounts between a battery pack 700 that has been fully charged and other battery packs 700 in the assembled battery that have not reached full charge is greater when an attempt is made to fully charge the assembled battery 7, due to the variation between battery packs 700 in the LED lighting times of the optical communication modules.

Figure 4:
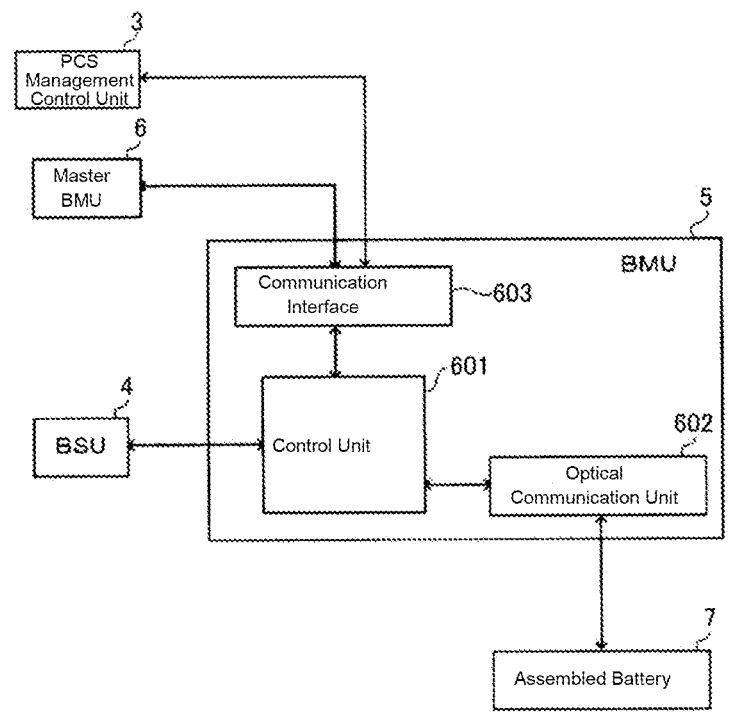
FIG. 4 is a diagram showing an example of the configuration of a battery management unit (BMU).

FIG. 4 is a diagram showing an example of the configuration of a battery management unit (BMU) 5. A BMU 5 is provided with a control unit 601, an optical communication unit 602, and a communication interface 603. The optical communication unit 602 comprises an optical transmission module and an optical reception module. The control unit 601 sends battery data request commands to the assembled battery 7 and acquires battery data from the assembled battery 7 via the optical communication unit 602. The control unit 601 also controls the connection state or open state of the BSU 4, and communicates with the PCS management control unit 3 and master BMU 6 (see FIG. 2) via the communication interface 603.

Figure 5:
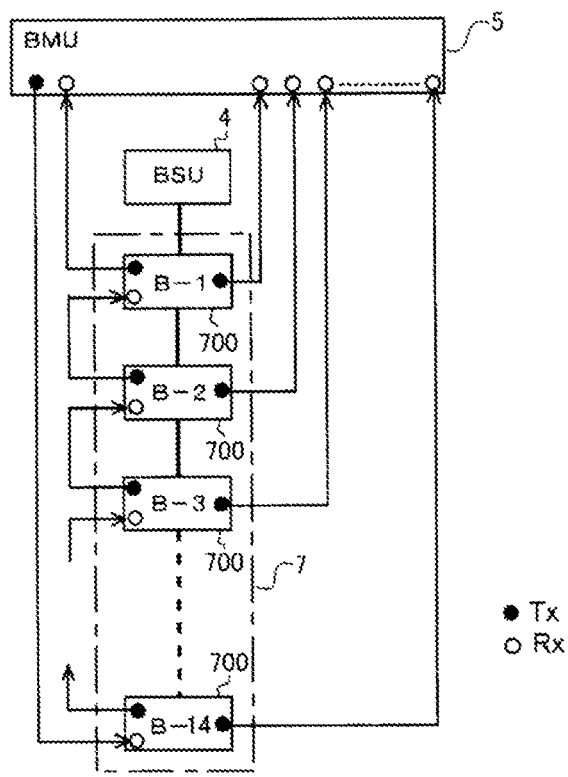
FIG. 5 is a diagram showing an example of communication between a BMU and an assembled battery using an optical line.
Figure 6:
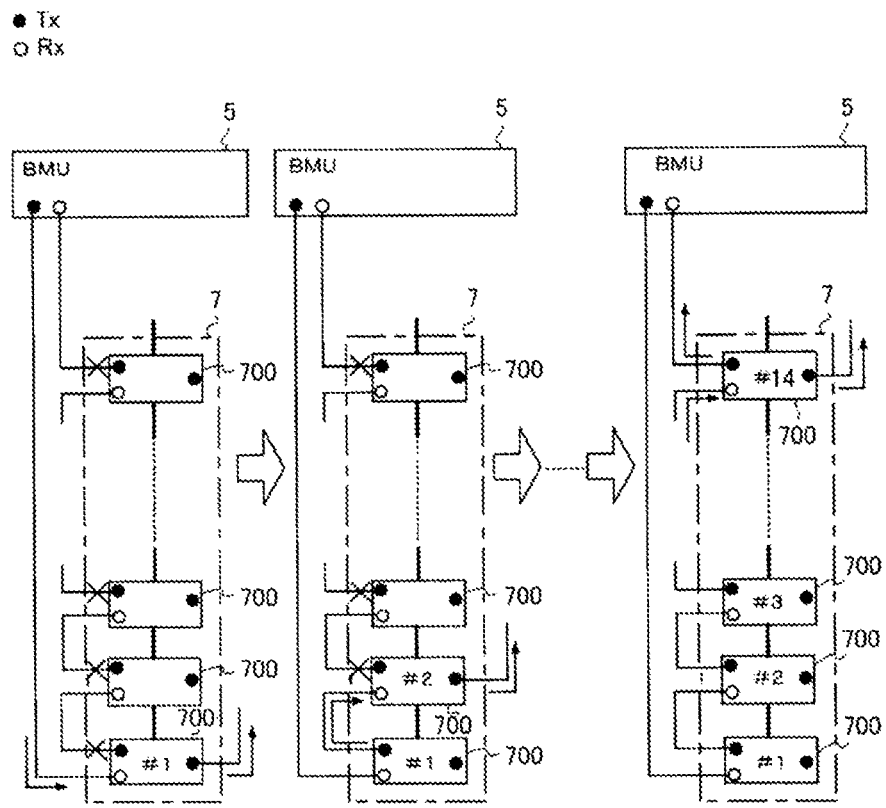
FIG. 6 is a diagram showing an example of the address allocation process in the example of communication between a BMU and an assembled battery using an optical line.

FIG. 5 is a diagram showing an example of communication between a BMU 5 and an assembled battery 7 using an optical line. In the example shown in FIG. 5, a daisy-chain connection is created between the BMU 5 and each battery pack 700 using optic fibers to perform communication related to battery data requests, and the optical transmission module Tx of each battery pack 700 is connected one-on-one to the fourteen optical reception modules Rx in the BMU 5 using optic fibers, in order to perform communication related to battery data.

In the communication method, the BMU 5 indicates broadcast addresses and transmits a battery data request command from its own light-transmitting module Tx. The battery pack 700 receiving the battery data request command determines that the broadcast addresses include its own address, transmits battery data from its own light-transmitting module Tx to the BMU 5, and transfers the battery data request command to the next adjacent battery pack 700. In this way, the fourteenth through second battery packs 700 successively transmit battery data to the BMU 5. When the first battery pack 700 receives the transferred battery data request command, it transmits battery data to the BMU 5 from its own light-transmitting module Tx, and transfers the battery data request command to the BMU 5.

When it has received the battery data request command, the BMU 5 can determine whether there has been data corruption or a break in the optical lines by confirming receipt of the battery data request command. An optical line connecting the first battery pack 700 to the BMU 5 for the transfer of the battery data request command is not essential (that is, the daisy chain connection pattern does not have to include this optical line).

By combining daisy chain connections with one-on-one connections in the present embodiment, the number of communication ports in the BMU 5 can be suppressed. The broadcast of battery data request commands and the one-on-one connections for the transmission of battery data reduces the discrepancies of LED lighting times between battery packs 700, reduces the difference in storage capacity between battery packs 700, and reduces the power consumed by lit LEDs.

In the present embodiment, the battery data from a given battery pack 700 can be instantly identified by the connection port. However, the address allocation process described below can be performed so that battery packs 700 can be correctly identified even when there are wiring errors. The address allocation process is performed as described below at the start of communication (see FIG. 6; the x marks in FIG. 6 mean "disabled").

(Step 1) First, the BMU 5 broadcasts address setting commands to each battery pack 700.

(Step 2) Each battery pack 700 disables its own optical transmission module Tx connected to the daisy chain.

(Step 3) The BMU 5 issues the initial ID number (for example, #1).

(Step 4) When its own optical transmission module Tx has been disabled, a battery pack 700 sets the received ID number as its own ID number, responds to the BMU 5 via the optical line for battery data transmission, and enables the optical transmission module Tx. The battery pack 700 then adds 1 to its own ID number and issues the resulting ID number to the adjacent battery pack 700.

(Step 5) When its own optical transmission module Tx has been disabled, the first battery pack 700 sets the received ID number as its own ID number, responds to the BMU 5 via the optical line for battery data transmission, and enables the optical transmission module Tx. The first battery pack 700 then adds 1 to its own ID number and issues the resulting ID number (=initial value+14) via the optical line in the daisy chain connection. When the BMU 5 receives the ID number issued by the first battery pack 700, the address allocation process is ended.

When this address allocation process has been performed, each battery pack 700 sends its own ID number to the BMU 5 during battery data transmission. In this way, the BMU 5 is able to correctly identify which battery pack 700 has sent the battery data without having to rely on one-on-one wiring which connects fourteen optical reception modules Rx in the BMU 5 to each of fourteen optical transmission modules Tx. Because the wiring used to communicate battery data requests uses a daisy chain pattern in which adjacent battery packs 700 are connected in series, the address allocation process is performed effectively with little possibility of wiring errors.

Capacity Learning of Assembled Battery

Figure 7:
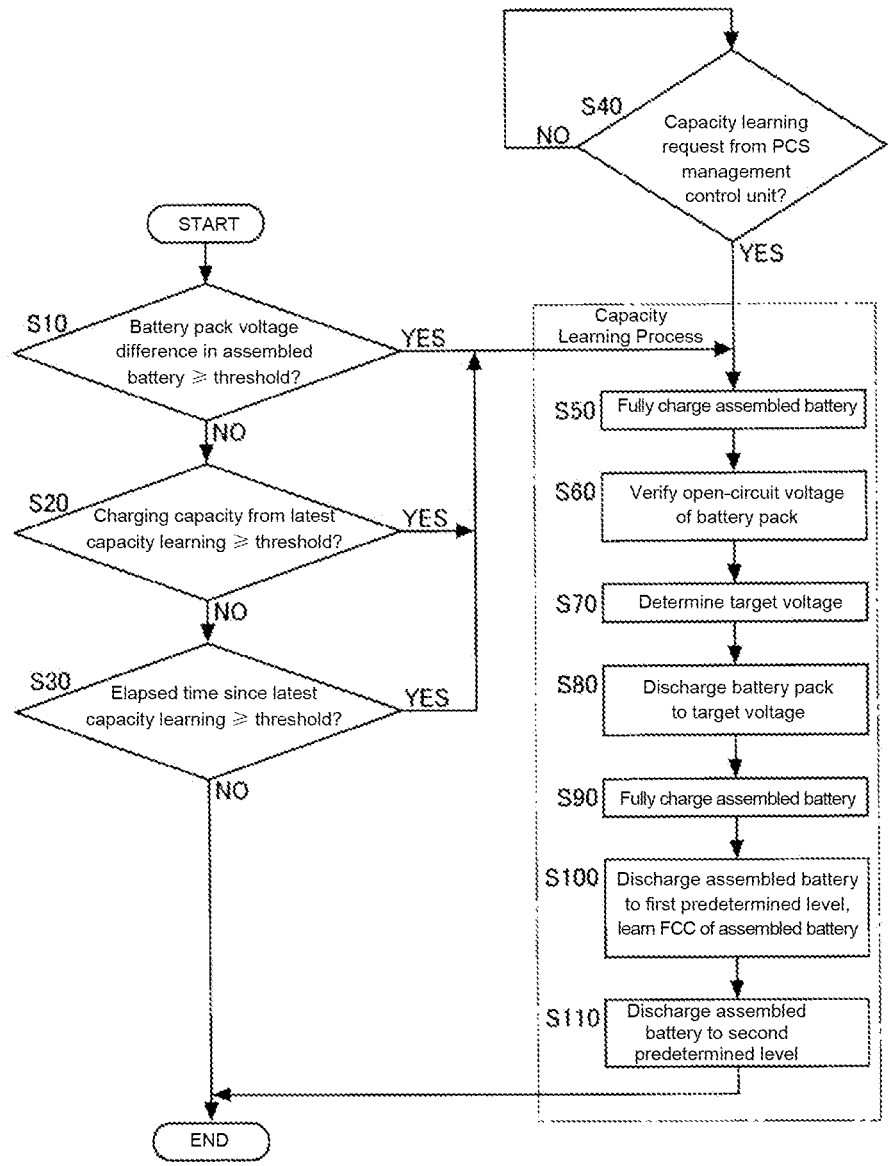
FIG. 7 is a flowchart of the capacity learning process performed on each assembled battery by the power supply system in an embodiment shown in FIG. 2.

FIG. 7 is a flowchart of the capacity learning process performed on each assembled battery by the power supply system in the embodiment shown in FIG. 2. The flowchart shown in FIG. 7 may be implemented in sequential order on the assembled battery 7 in each series.

First, the master BMU 6 determines whether the battery pack voltage difference in an assembled battery 7 targeted for the capacity learning process (the difference between the maximum and minimum values for the voltage of each battery pack in the assembled battery 7 targeted for the capacity learning process) is equal to or greater than a predetermined threshold value (Step S10). When the battery pack voltage difference in the assembled battery 7 targeted for the capacity learning process is equal to or greater than the predetermined threshold value (Step S10: YES), the master BMU 6 sends a capacity learning request command to the BMU 5 corresponding to the assembled battery 7 targeted for the capacity learning process. The process then advances to Step S50 described below.

When the battery pack voltage difference in the assembled battery 7 targeted for the capacity learning process is not equal to or greater than the predetermined threshold value (Step S10: NO), the master BMU 6 determines whether or not the charge and discharge amount at the time of completion for the latest (most recent) capacity learning process for the assembled battery 7 targeted for the capacity learning process is equal to or greater than a predetermined threshold value (Step S20). When the charge and discharge amount at the time of completion for the latest (most recent) capacity learning process for the assembled battery 7 targeted for the capacity learning process is equal to or greater than a predetermined threshold value (Step S20: YES), the master BMU 6 sends a capacity learning request command to the BMU 5 corresponding to the assembled battery 7 targeted for the capacity learning process. The process then advances to Step S50 described below.

When the charge and discharge amount at the time of completion for the latest (most recent) capacity learning process for the assembled battery 7 targeted for the capacity learning process is not equal to or greater than a predetermined threshold value (Step S20: NO), the master BMU 6 determines whether or not the amount of time that has elapsed since the completion for the latest (most recent) capacity learning process for the assembled battery 7 targeted for the capacity learning process is equal to or greater than a predetermined threshold value (Step S30). When the amount of time that has elapsed since the completion for the latest (most recent) capacity learning process for the assembled battery 7 targeted for the capacity learning process is equal to or greater than a predetermined threshold value (Step S30: YES), the master BMU 6 sends a capacity learning request command to the BMU 5 corresponding to the assembled battery 7 targeted for the capacity learning process. The process then advances to Step S50 described below.

When the amount of time that has elapsed since the completion for the latest (most recent) capacity learning process for the assembled battery 7 targeted for the capacity learning process is not equal to or greater than a predetermined threshold value (Step S30: NO), the operational flow is ended without performing capacity learning.

The master BMU 6 also monitors whether or not a capacity learning request command has been sent from a PCS management control unit 3 via a BMU 5 (Step S40). When a capacity learning request command has been sent from a PCS management control unit 3 via a BMU 5 (Step S40: YES), the process advances to Step S50 described below.

In Step 50, the BMU 5 corresponding to the assembled battery 7 targeted for the capacity learning process controls, via PCS management control unit 3, the PCS 2 corresponding to the assembled battery 7 targeted for the capacity learning process, and fully charges the assembled battery 7 targeted for the capacity learning process. When there is a difference in storage capacity between battery packs in the assembled battery 7 targeted for the capacity learning process, only one of the battery packs in the assembled battery 7 targeted for the capacity learning process is fully charged. The other battery packs in the assembled battery 7 targeted for the capacity learning process are not fully charged.

In Step S60 following Step S50, the BMU 5 corresponding to the assembled battery 7 targeted for the capacity learning process confirms the open-circuit voltage of each battery pack in the assembled battery 7 targeted for the capacity learning process.

In Step S70 following Step S60, the BMU 5 corresponding to the assembled battery 7 targeted for the capacity learning process determines the target voltage on the basis of the confirmation results in Step S60. For example, when the minimum value of the open-circuit voltages of each battery pack in the assembled battery 7 targeted for the capacity learning process is set as the target voltage, the accuracy of the capacity learning process performed on the assembled battery is improved the most. However, as the target voltage is reduced, the processing time required for Step S80 described below is increased. Therefore, an intermediate value between the maximum value and the minimum value of the open-circuit voltages of each battery pack in the assembled battery 7 targeted for the capacity learning process (for example, the average value for the open-circuit voltage of each battery pack) may be set as the target value without sacrificing much accuracy in the capacity learning process performed on the assembled battery. When the difference between the maximum value and the minimum value of the open-circuit voltages of each battery pack in the assembled battery 7 targeted for the capacity learning process is equal to or less than a predetermined value, the minimum value of the of the open-circuit voltages of each battery pack in the assembled battery 7 targeted for the capacity learning process may be set as the target voltage. When the difference between the maximum value and the minimum value of the open-circuit voltages of each battery pack in the assembled battery 7 targeted for the capacity learning process is greater than a predetermined value, an intermediate value between the maximum value and the minimum value of the open-circuit voltages of each battery pack in the assembled battery 7 targeted for the capacity learning process (for example, the average value for the open-circuit voltage of each battery pack) may be set as the target voltage.

In Step S80 following Step S70, the BMU 5 corresponding to the assembled battery 7 targeted for the capacity learning process controls the assembled battery 7 targeted for the capacity learning process, and causes the discharge unit 705 (see FIG. 3) to discharge each battery pack in the assembled battery 7 targeted for the capacity learning process having an open-circuit voltage greater than the target voltage until the open-circuit voltage has reached the target voltage. At this time, the BMU 5 corresponding to the assembled battery 7 targeted for the capacity learning process sends a discharge command only to the battery packs in the assembled battery 7 targeted for the capacity learning process having an open-circuit voltage greater than the target voltage, but also broadcasts the target voltage and a discharge command to all of the battery packs in the assembled battery 7 targeted for the capacity learning process. Next, each battery pack sends its discharge state from the discharge unit 705 (see FIG. 3) (this corresponds to the block discharge state and indicates whether or not discharge is being performed) to the BMU 5, and then discharges to the target voltage. Then, the block discharge state is changed from ON (discharging) to OFF (not discharging), and sends this state to the BMU 5. The discharge performed by the discharge unit 705 (see FIG. 3) uses a discharge amount per unit of time that is set to a very low value in order to suppress any rise in temperature due to the discharge.

In Step S90 following Step S80, the BMU 5 corresponding to the assembled battery 7 targeted for the capacity learning process controls the PCS 2 corresponding to the assembled battery 7 targeted for the capacity learning process via the PCS management control unit 3 to fully charge the assembled battery 7 targeted for the capacity learning process once again. When one of the battery packs in the assembled battery 7 targeted for the capacity learning process has become fully charged, the charging process is stopped. As a result, the other battery packs in the assembled battery 7 targeted for the capacity learning process do not become fully charged. However, the BMU 5 corresponding to the assembled battery 7 targeted for the capacity learning process issues a notification indicating that a battery pack has been fully charged (the full charge setting request described below) to the other battery packs in the assembled battery 7 targeted for the capacity learning process.

Because the full charge in Step S90 is performed after the process in Step S80, the variation in the amount of charge among the battery packs of the assembled battery 7 targeted for the capacity learning process is less when the full charge is ended in Step S90 than when the full charge is ended in Step S50.

In Step S100 following Step S90, the BMU 5 corresponding to the assembled battery 7 targeted for the capacity learning process controls the PCS 2 corresponding to the assembled battery 7 targeted for the capacity learning process via the PCS management control unit 3 to discharge the assembled battery 7 targeted for the capacity learning process to a first predetermined level. In other words, one or more battery packs in the assembled battery 7 targeted for the capacity learning process is discharged to a certain level (the level corresponding to the first predetermined level). At this time, the BMU 5 corresponding to the assembled battery 7 targeted for the capacity learning process or each battery pack in the assembled battery 7 targeted for the capacity learning process adds up the discharge amount of each battery pack from the full charge, calculates the full charge capacity of each battery pack on the basis of the result, and updates the full charge capacity of each battery pack in the assembled battery 7 targeted for the capacity learning process. The first predetermined level should be the level corresponding to full discharge. However, in the present embodiment, drive power for the optical communication unit 704 of the battery packs (see FIG. 3) is drawn from the rechargeable battery cells 701 (see FIG. 3), so there would not be communication between the BMU 5 and the assembled battery 7 if the battery pack were completely discharged. Therefore, the first predetermined level is set so there is some remaining charge (for example, SOC=8%).

In Step S110 following Step S100, the BMU 5 corresponding to the assembled battery 7 targeted for the capacity learning process controls the PCS 2 corresponding to the assembled battery 7 targeted for the capacity learning process via the PCS management control unit 3 to charge the assembled battery 7 targeted for the capacity learning process to a second predetermined level and end the operational flow. The assembled battery 7 stores a greater charge at the second predetermined level than at the first predetermined level. By charging the assembled battery 7 targeted for the capacity learning process to the second predetermined level, the assembled battery 7 targeted for the capacity learning process can be discharged unproblematically when the assembled battery 7 targeted for the capacity learning process has returned to the normal charging and discharging mode.

Communication Sequence During Capacity Learning of Assembled Battery

The following is an explanation of the communication sequence during capacity learning for an assembled battery 7 with reference to FIG. 8 through FIG. 16.

Figure 8:
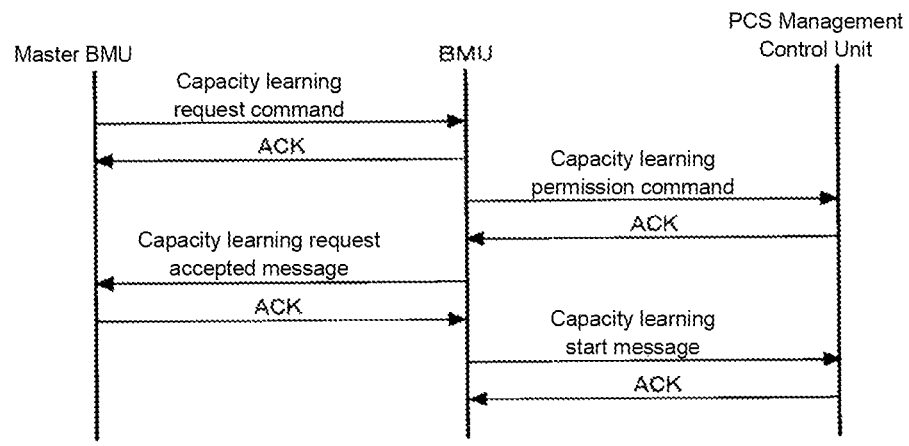
FIG. 8 is a diagram showing a first pattern for the start sequence, up until the start of the capacity learning process in FIG. 7.

FIG. 8 is a diagram showing a first pattern for the start sequence, up until the start of the capacity learning process in FIG. 7. In the start sequence shown in FIG. 8, the master BMU 6 first sends a capacity learning request command to the BMU 5. When the BMU 5 receives a capacity learning request command from the master BMU 6, an affirmative acknowledgement signal ACK is returned, and a capacity learning permission command is sent to the PCS management control unit 3 in communication with the BMU 5. When the PCS management control unit 3 in communication with the BMU 5 receives the capacity learning permission command from the BMU 5, it replies with an affirmative acknowledgement signal ACK.

When the BMU 5 has received the affirmative acknowledgement signal ACK from the PCS management control unit 3 in communication with the BMU 5, a capacity learning request accepted message is sent to the master BMU 6.

When the capacity learning request accepted message is received from the BMU 5, the master BMU 6 replies with an affirmative acknowledgement signal ACK. When the affirmative acknowledgement signal ACK is received from the master BMU 6, the BMU 5 starts the capacity learning process in FIG. 7, and sends a capacity learning start message to the PCS management control unit 3 in communication with the BMU 5.

When the PCS management control unit 3 in communication with the BMU 5 receives the capacity learning start message from the BMU 5, it replies with an affirmative acknowledgement signal ACK to the BMU 5 after the PCS 2 corresponding to the BMU 5 has been pre-charged and the assembled battery 7 corresponding to the BMU 5 has been connected to the power line.

When an affirmative acknowledgement signal ACK has been received from the PCS management control unit 3 in communication with the BMU 5 after the BMU 5 has sent a capacity learning start message, the start sequence is ended.

Figure 9:
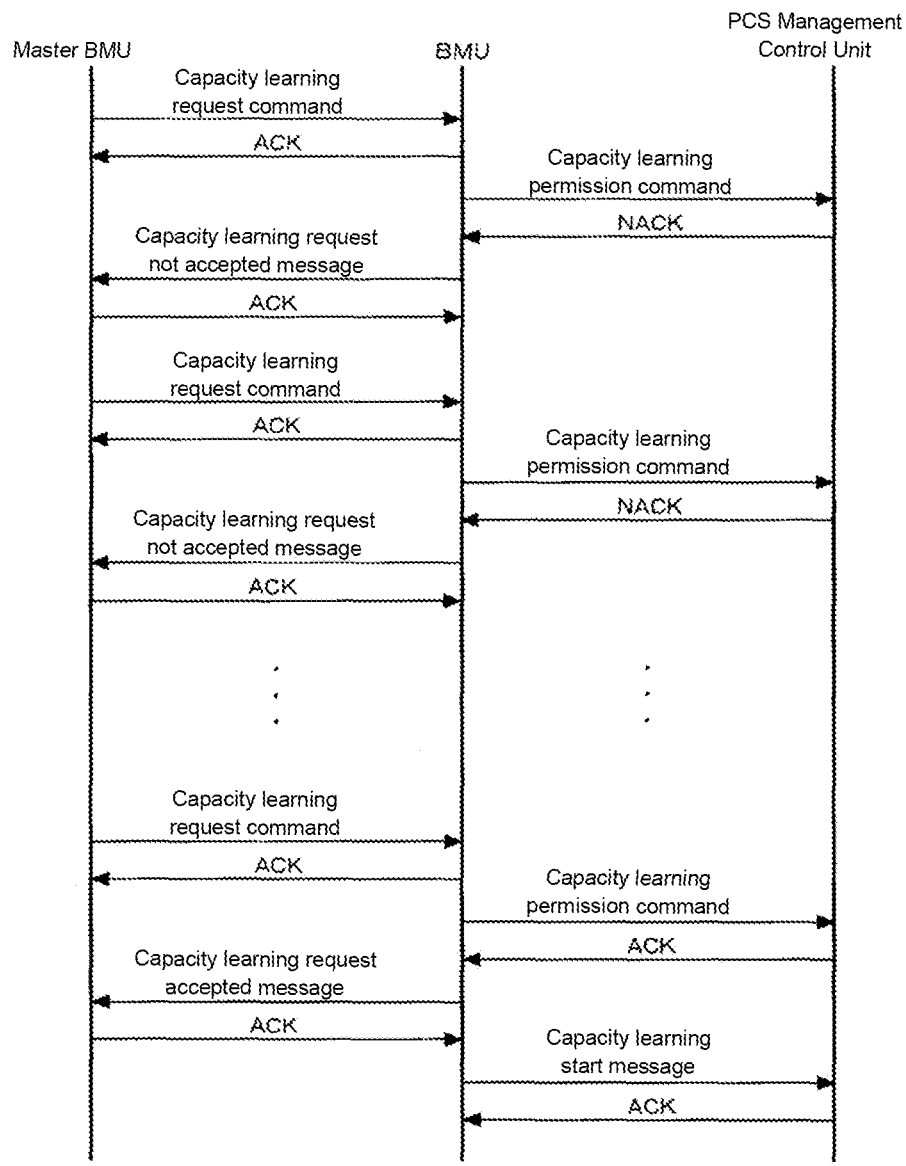
FIG. 9 is a diagram showing the permission standby sequence in the first pattern for the start sequence, up until the start of the capacity learning process in FIG. 7.

FIG. 9 is a diagram showing the permission standby sequence in the first pattern for the start sequence, up until the start of the capacity learning process in FIG. 7.

In the start sequence shown in FIG. 9, the master BMU 6 first sends a capacity learning request command to the BMU 5. When the BMU 5 receives a capacity learning request command from the master BMU 6, an affirmative acknowledgement signal ACK is returned, and a capacity learning permission command is sent to the PCS management control unit 3 in communication with the BMU 5. When the PCS management control unit 3 in communication with the BMU 5 receives the capacity learning permission command from the BMU 5, it replies with a negative acknowledgement signal NACK if the assembled battery 7 corresponding to the BMU 5 experiences a problem switching from the normal charging mode to the capacity learning mode.

When a negative acknowledgement signal NACK has been received from the PCS management control unit 3 in communication with the BMU 5, the BMU 5 sends a capacity learning request not accepted message to the BMU 6.

When the master BMU 6 receives a capacity learning request not accepted message from a BMU 5, it replies with an affirmative acknowledgement signal ACK and then resends a capacity learning request command to the BMU 5 after a predetermined period of time has passed.

This operation is repeated until the PCS management control unit 3 in communication with the BMU 5 replies to a capacity learning permission request sent by the BMU 5 with an affirmative acknowledgement signal ACK. When the PCS management control unit 3 in communication with the BMU 5 replies to a capacity learning permission request sent by the BMU 5 with an affirmative acknowledgement signal ACK, the remaining steps are identical to the sequence of operations shown in FIG. 8.

Figure 10:
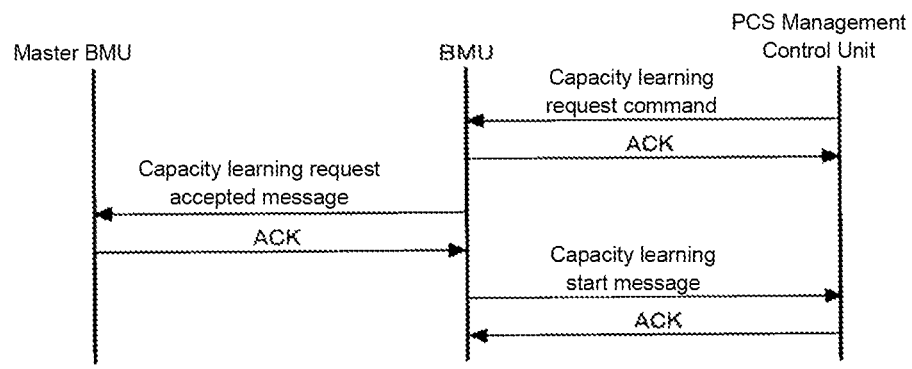
FIG. 10 is a diagram showing a second pattern for the start sequence, up until the start of the capacity learning process in FIG. 7.

The following is an explanation of a second pattern for the start sequence up to the start of the capacity learning process in FIG. 7. FIG. 10 is a diagram showing the second pattern for the start sequence, up until the start of the capacity learning process in FIG. 7. In the start sequence shown in FIG. 10, the PCS management control unit 3 sends a learning capacity request command to the BMU 5 in communication with the PCS management control unit 3. When the BMU 5 receives a capacity learning request command from the PCS management control unit 3, it replies with an affirmative acknowledgement signal ACK, and sends a capacity learning accepted message to the master BMU 6. When a capacity learning accepted message has been received from the BMU 5, the master BMU 6 replies with an affirmative acknowledgement signal ACK.

When an affirmative acknowledgement signal ACK has been received from the master BMU 6, the BMU 5 starts the capacity learning process shown in FIG. 7 and sends a capacity learning start message to the PCS management control unit 3.

When a capacity learning start message has been received from the BMU 5, the PCS management control unit 3 replies to the BMU 5 with an affirmative acknowledgement signal ACK after the PCS 2 corresponding to the BMU 5 has been pre-charged and the assembled battery 7 corresponding to the BMU 5 has been connected to a power line.

When an affirmative acknowledgement signal ACK has been received from the PCS management control unit 3, the BMU 5 ends the start sequence.

Figure 11:
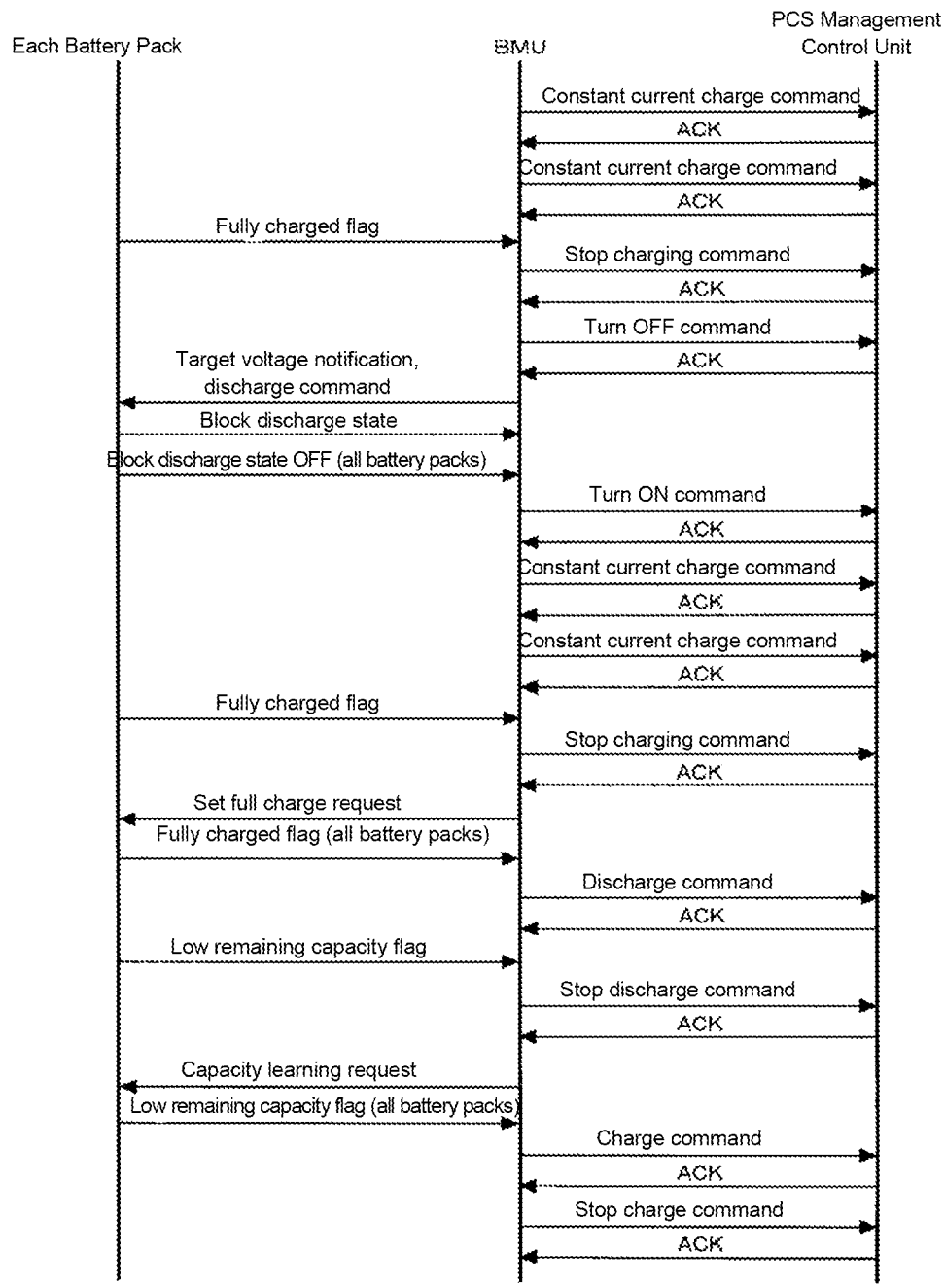
FIG. 11 is a diagram showing the normal sequence.

The capacity learning process in FIG. 7 is started during the normal sequence after the start sequence described above has ended. FIG. 11 shows the normal sequence. In the normal sequence shown in FIG. 11, a BMU 5 first sends a constant current charge command to the PCS management control unit 3 in communication with the BMU 5 to charge the assembled battery 7 corresponding to the BMU 5 using a constant current (for example, 7.68 A). When a constant current charge command has been received from the BMU 5, the PCS management control unit 3 sends an affirmative acknowledgement signal ACK to the BMU 5 in acknowledgement of the constant current charge command from the BMU 5.

Afterwards, when the series voltage of the assembled battery 7 corresponding to the BMU 5 or the maximum value of the voltages of each battery pack in the assembled battery 7 corresponding to the BMU 5 reaches a given voltage threshold value, the BMU 5 sends a constant voltage charge command to the PCS management control unit 3 in communication with the BMU 5 to charge the assembled battery 7 corresponding to the BMU 5 using a constant voltage. When a constant voltage charge command has been received from the BMU 5, the PCS management control unit 3 sends an affirmative acknowledgement signal ACK to the BMU 5 in acknowledgement of the constant voltage charge command from the BMU 5.

When the BMU 5 has received a fully charged flag from one or more of the battery packs in the assembled battery 7 corresponding to the BMU 5, it determines that the assembled battery 7 corresponding to the BMU 5 has been fully charged, and sends a stop charge command to the PCS management control unit 3. When the PCS management control unit 3 has received a stop charge command from the BMU 5, it sends an affirmative acknowledgement signal ACK to the BMU 5 in acknowledgement of the stop charge command from the BMU 5. The process in Step S50 of the flowchart shown in FIG. 7 ends with this operation.

Next, the BMU 5 sends to the PCS management control unit 3 a turn OFF command requesting control of the state of the PCS 2 corresponding to the BMU 5 so that the assembled battery 7 corresponding to the BMU 5 can be disconnected from the power line. When a turn OFF command is received from the BMU 5, the PCS management control unit 3 replies to the BMU 5 with an affirmative acknowledgement signal ACK after the state of the PCS 2 corresponding to the BMU 5 is controlled so that the assembled battery 7 corresponding to the BMU 5 can be disconnected from the power line. When an affirmative acknowledgement signal ACK has been received from the PCS management control unit 3 in response to the turn OFF command, the BMU 5 performs Step S60 and Step S70 in the flowchart shown in FIG. 7, and then broadcasts target voltage information and a discharge command to all of the battery packs in the assembled battery 7 corresponding to the BMU 5. When the target voltage information and a discharge command broadcast by the BMU 5 has been received, each battery pack in the assembled battery 7 corresponding to the BMU 5 responds to the BMU 5 with its block discharge state. When each battery pack in the assembled battery 7 corresponding to the BMU 5 has finished discharging to the target voltage, a block discharge state OFF signal is sent to the BMU 5. When a block discharge state OFF signal has been received from all of the battery packs in the assembled battery 7 corresponding to the BMU 5, the BMU 5 ends the process in Step S80 of the flowchart shown in FIG. 7.

Next, the BMU 5 sends to the PCS management control unit 3 a turn ON command to request control of the state of the PCS 2 corresponding to the BMU 5 in order to connect the assembled battery 7 corresponding to the BMU 5 to a power line. When a turn ON command has been received from the BMU 5, the PCS management control unit 3 replies to the BMU 5 with an affirmative acknowledgement signal ACK after pre-charging the PCS 2 corresponding to the BMU 5 and having the PCS 2 corresponding to the BMU 5 connect the assembled battery 7 corresponding to the BMU 5 to a power line.

When an affirmative acknowledgement signal ACK has been received from the PCS management control unit 3 in acknowledgement of the turn ON command, the BMU 5 sends to the PCS management control unit 3 in communication with the BMU 5 a constant current charge command to charge the assembled battery 7 corresponding to the BMU 5 using a constant current (for example, 7.68 A). When a constant current charge command has been received from the BMU 5, the PCS management control unit 3 replies to the BMU 5 with an affirmative acknowledgement signal ACK in acknowledgement of the constant current charge command from the BMU 5.

Afterwards, when the series voltage of the assembled battery 7 corresponding to the BMU 5 or the maximum value of the voltages of each battery pack in the assembled battery 7 corresponding to the BMU 5 reaches a given voltage threshold value, the BMU 5 sends a constant voltage charge command to the PCS management control unit 3 in communication with the BMU 5 to charge the assembled battery 7 corresponding to the BMU 5 using a constant voltage. When a constant voltage charge command has been received from the BMU 5, the PCS management control unit 3 sends an affirmative acknowledgement signal ACK to the BMU 5 in acknowledgement of the constant voltage charge command from the BMU 5.

When the BMU 5 has received a fully-charged flag from one or more of the battery packs in the assembled battery 7 corresponding to the BMU 5, it determines that the assembled battery 7 corresponding to the BMU 5 has been fully charged, and sends a stop charge command to the PCS management control unit 3. When the PCS management control unit 3 has received a stop charge command from the BMU 5, it sends an affirmative acknowledgement signal ACK to the BMU 5 in acknowledgement of the stop charge command from the BMU 5. When an affirmative acknowledgement signal ACK has been received in response to the stop charge command, the BMU 5 sends a request to each battery pack to set each battery pack to fully charged. When each battery pack in the assembled battery 7 corresponding to the BMU 5 has received a request from the BMU 5 to set each battery pack to fully charged, each battery pack replies to the BMU 5 with a fully-charged flag. When a fully charged flag has been received from all of the battery packs in the assembled battery 7 corresponding to the BMU 5, the BMU 5 ends the process in Step S90 of the flowchart shown in FIG. 7.

Next, the BMU 5 sends to the PCS management control unit 3 a discharge command to discharge the assembled battery 7 corresponding to the BMU 5 using a constant current (for example, 19.2 A). The PCS management control unit 3 replies to the BMU 5 with an affirmative acknowledgement signal ACK in acknowledgement of the discharge command.

When a low remaining capacity flag (a flag indicating that the SOC has reached 8%) has been received from one or more of the battery packs in the assembled battery 7 corresponding to the BMU 5, the BMU 5 determines that the assembled battery 7 corresponding to the BMU 5 has been discharged to the first predetermined level, and a stop discharge command is sent to the PCS management control unit 3. When a stop discharge command has been received from the BMU 5, the PCS management control unit 3 replies to the BMU 5 with an affirmative acknowledgement signal ACK. In the present embodiment, the low remaining capacity flag indicates that the SOC has reached 8%. However, a value other than 8% may be used. The BMU 5 does not have to send a stop discharge command to the PCS management control unit 3 when a low remaining capacity flag (a flag indicating that the SOC has reached 8%) has been received from one or more of the battery packs in the assembled battery 7 corresponding to the BMU 5. Instead, the BMU 5 may send a stop discharge command to the PCS management control unit 3 when a discharge terminated flag (a flag indicating that the SOC has reached 0%) has been received from one or more of the battery packs in the assembled battery 7 corresponding to the BMU 5.

When the BMU 5 has received an affirmative acknowledgement signal ACK from the PCS management control unit 3 in response to the stop discharge command, it broadcasts a capacity learning request to each battery pack. When a capacity learning request has been received from the BMU 5, each battery pack updates the full charge capacity on the basis of the results of adding up the discharge amount, and sends a low remaining capacity flag to the BMU 5. Here, a discharge terminated flag can be used instead of a low remaining capacity flag. The process in Step S100 of the flowchart shown in FIG. 7 ends with this operation.

Next, the BMU 5 sends to the PCS management control unit 3 in communication with the BMU 5 a constant current charge command to charge the assembled battery 7 corresponding to the BMU 5 using a constant current (for example, 7.68 A). When a constant current charge command has been received from the BMU 5, the PCS management control unit 3 replies to the BMU 5 with an affirmative acknowledgement signal ACK in acknowledgement of the constant current charge command from the BMU 5.

Afterwards, when the BMU 5 has detected that charging has been performed to a predetermined SOC or predetermined voltage, it determines that the assembled battery 7 corresponding to the BMU 5 has been charged to the second predetermined level, and sends a stop charge command to the PCS management control unit 3 in communication with the BMU 5.

When charging to the predetermined SOC is detected, an SOC calculated by each battery pack in the assembled battery 7 corresponding to the BMU 5 does not have to be used. Instead, an SOC calculated by the BMU 5 may be used. When an SOC calculated by each battery pack in the assembled battery 7 corresponding to the BMU 5 is used, charging to the predetermined SOC may be detected when one or more of the battery packs in the assembled battery 7 corresponding to the BMU 5 has reached the predetermined SOC. Alternatively, charging to the predetermined SOC may be detected when the average SOC of the battery packs in the assembled battery 7 corresponding to the BMU 5 has reached the predetermined SOC. When charging to the predetermined voltage is detected, the voltage detected by each battery pack in the assembled battery 7 corresponding to the BMU 5 does not have to be used. Instead, the series voltage of the assembled battery 7 detected by the BMU 5 may be used. When the voltage detected by each battery pack in the assembled battery 7 corresponding to the BMU 5 is used, charging to the predetermined voltage may be detected when one or more of the battery packs in the assembled battery 7 corresponding to the BMU 5 has reached the predetermined voltage.

When a stop charge command has been received from the BMU 5, the PCS management control unit 3 replies to the BMU 5 with an affirmative acknowledgement signal ACK to acknowledge the stop charge command from the BMU 5. The process in Step S110 of the flowchart shown in FIG. 7 ends with this operation.

During the normal sequence, the PCS management control unit 3 periodically sends BMU state acquisition command to the BMU 5 with which it communicates, in order to periodically report the state of the BMU 5.

During the normal sequence, the BMU 5 periodically sends a BMU state response (response signal to the BMU state acquisition command) to the PCS management control unit 3, in order to periodically report its own state.

When constant current charging cannot be performed during the normal sequence, constant power charging may be performed instead of constant current charging. For example, the constant power value may be 5.17 kW when the constant current value is 7.68 A. This is calculated based on the assumption of an assembled battery 7 composed of fourteen battery packs connected in series, and a nominal voltage of 48.1 V for each battery pack. In this illustration, the constant current value is 7.68 A, and the constant power value is 5.17 kW, but other values may also be used.

Also, when constant current discharging cannot be performed during the normal sequence, constant power discharging may be performed instead of constant current discharging. For example, the constant power value may be 12.93 kW when the constant current value is 19.2 A. This is calculated based on the assumption of an assembled battery 7 composed of fourteen battery packs connected in series, and a nominal voltage of 48.1 V for each battery pack. In this illustration, the constant current value is 19.2 A, and the constant power value is 12.93 kW, but other values may also be used.

Figure 12:
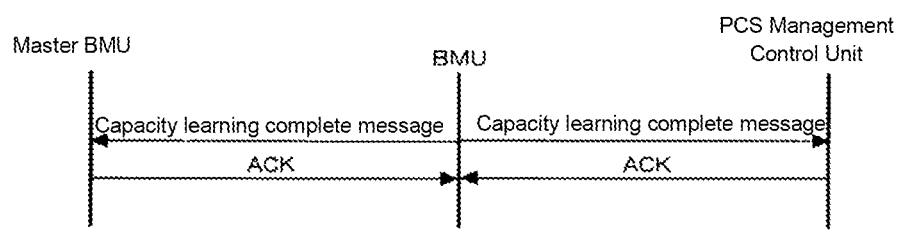
FIG. 12 is a diagram showing the end sequence.

When the normal sequence has ended properly, the end sequence is executed. The end sequence is shown in FIG. 12. In the end sequence shown in FIG. 12, a BMU 5 sends a capacity learning completed message to the master BMU 6, and also sends the capacity learning completed message to the PCS management control unit 3 in communication with the BMU 5. The master BMU 6 and the PCS management control unit 3 reply to the BMU 5 with an affirmative acknowledgement signal ACK. When an affirmative acknowledgement signal ACK has been received from the master BMU 6 and the PCS management control unit 3, the BMU 5 returns to the normal charging and discharging mode.

Figure 13:
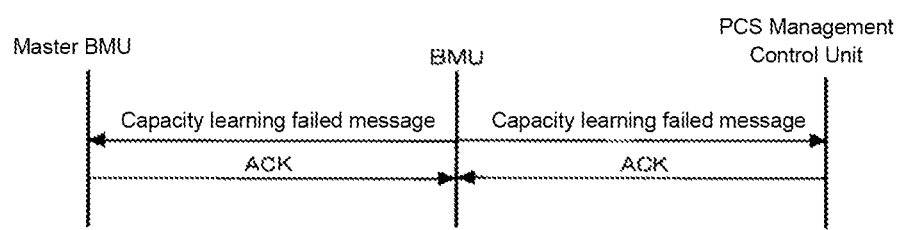
FIG. 13 is a diagram showing the error sequence.

An error sequence is executed when the normal sequence described above has not ended properly. The error sequence is shown in FIG. 13. In the error sequence shown in FIG. 13, the BMU 5 sends a capacity learning failure message to the master BMU 6, and also sends the capacity learning failure message to the PCS management control unit 3 in communication with the BMU 5. The master BMU 6 and the PCS management control unit 3 reply to the BMU 5 with an affirmative acknowledgement signal ACK. When an affirmative acknowledgement signal ACK has been received from the master BMU 6 and the PCS management control unit 3, the BMU 5 returns to the normal charging and discharging mode.

Suspension of capacity learning may be requested by the master BMU 6 or a PCS management control unit 3 for various reasons while the normal sequence described above is being executed. The following is an explanation of the suspension sequence executed in these situations.

Figure 14:
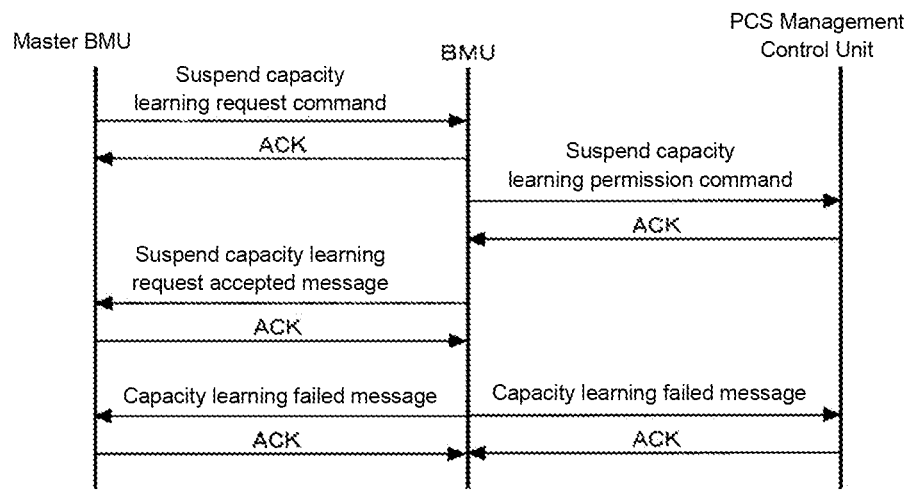
FIG. 14 is a diagram showing a first pattern for the suspension sequence.

FIG. 14 is a diagram showing a first pattern for the suspension sequence. In the suspension sequence shown in FIG. 14, the master BMU 6 first sends a capacity learning suspension request command to a BMU 5. When the BMU 5 receives the capacity learning suspension request command from the master BMU 6, it responds with an affirmative acknowledgement command ACK, and sends a capacity learning suspension permission command to the PCS management control unit 3 in communication with the BMU 5. When a capacity learning suspension permission command has been received from the BMU 5, the PCS management control unit 3 in communication with the BMU 5 replies with an affirmative acknowledgement signal ACK. When an affirmative acknowledgement signal ACK has been received from the PCS management control unit 3 in communication with the BMU 5, the BMU 5 sends a capacity learning suspension request accepted message to the master BMU 6. When the master BMU 6 has received a capacity learning suspension request accepted message from the BMU 5, it replies with an affirmative acknowledgement signal ACK. When an affirmative acknowledgement signal ACK has been received from the master BMU 6 in response to the capacity learning suspension accepted message, the BMU 5 sends a capacity learning failure message to the master BMU 6, and also sends a capacity learning failure message to the PCS management control unit 3 in communication with the BMU 5. The master BMU 6 and the PCS management control unit 3 respond to the BMU 5 with an affirmative acknowledgement signal ACK. When an affirmative acknowledgement signal ACK has been received from the master BMU 6 and the PCS management control unit 3, the BMU 5 returns to the normal charging and discharging mode.

Figure 15:
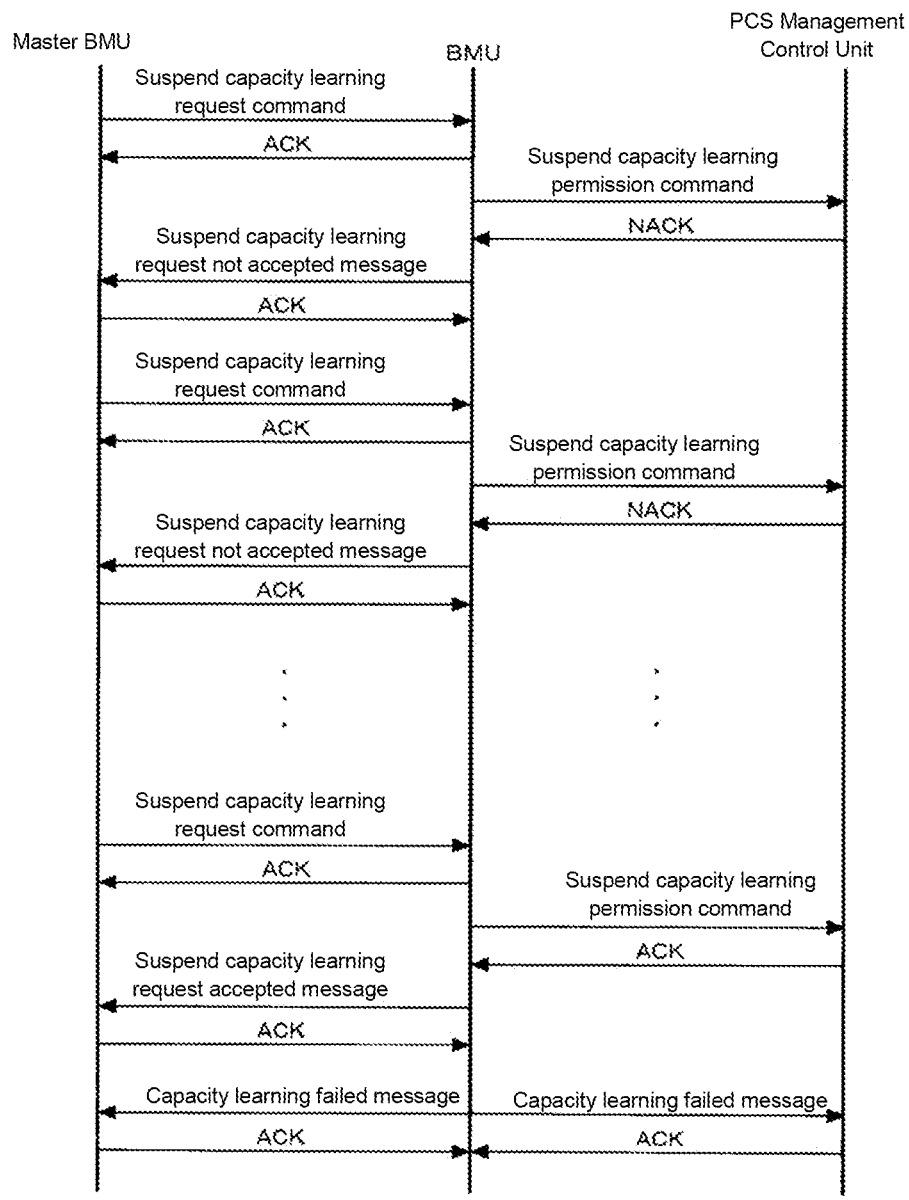
FIG. 15 is a diagram showing the permission standby sequence in the first pattern for the suspension sequence.

FIG. 15 is a diagram showing the permission standby sequence in the first pattern for the suspension sequence in FIG. 14.

In the suspension sequence shown in FIG. 15, the master BMU 6 first sends a capacity learning suspension request command to a BMU 5. When a capacity learning suspension request command has been received from the master BMU 6, the BMU 5 replies with an affirmative acknowledgement signal ACK, and sends a capacity learning suspension permission command to the PCS management control unit 3 in communication with the BMU 5. When a capacity learning suspension permission command is received from the BMU 5, the PCS management control unit 3 in communication with the BMU 5 replies with a negative acknowledgement signal NACK if a problem has occurred with suspending the capacity learning process.

When a negative acknowledgement signal NACK has been received from the PCS management control unit 3 in communication with the BMU 5, the BMU 5 sends a capacity learning suspension request not accepted message to the master BMU 6.

When a capacity learning suspension request not accepted message is received from the BMU 5, the master BMU 6 replies with an affirmative acknowledgement signal ACK and, after a predetermined period of time has passed, sends a capacity learning suspension request command to the BMU 5 once again.

This operation is repeated until the PCS management control unit 3 in communication with the BMU 5 replies to a capacity learning suspension permission request sent by the BMU 5 with an affirmative acknowledgement signal ACK. When the PCS management control unit 3 in communication with the BMU 5 replies to a capacity learning suspension permission request sent by the BMU 5 with an affirmative acknowledgement signal ACK, the remaining steps are identical to the sequence of operations shown in FIG. 14.

Figure 16:
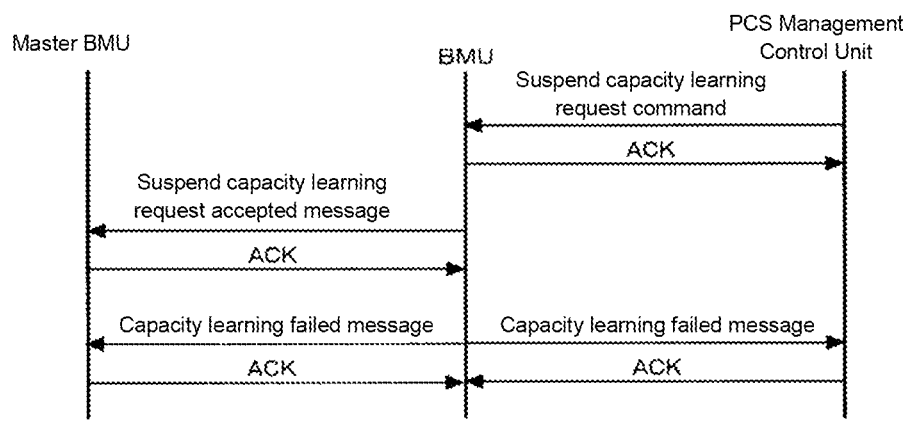
FIG. 16 is a diagram showing a second pattern for the suspension sequence.

FIG. 16 is a diagram showing a second pattern for the suspension sequence. In the termination sequence shown in FIG. 16, the PCS management control unit 3 in communication with a BMU 5 sends a capacity learning suspension request command to the BMU 5. When the BMU 5 receives a capacity learning suspension request command from the PCS management control unit 3 in communication with the BMU 5, it replies with an affirmative acknowledgement signal ACK, and sends a capacity learning suspension request accepted message to the master BMU 6. When a capacity learning suspension request accepted message has been received from a BMU 5, the master BMU 6 replies with an affirmative acknowledgement signal ACK. When the BMU 5 receives an affirmative acknowledgement signal ACK from the master BMU 6 for the capacity learning suspension request accepted message, it sends a capacity learning failure message to the master BMU 6, and also sends the capacity learning failure message to the PCS management control unit 3 in communication with the BMU 5. The master BMU 6 and PCS management control unit 3 both reply to the BMU 5 with an affirmative acknowledgement signal ACK. When an affirmative acknowledgement signal ACK has been received from both the master BMU 6 and the PCS management control unit 3, the BMU 5 returns to the normal charging and discharging mode.

In the embodiment described above, the master BMU 6 made each of the determinations in Steps S10 through S30 of FIG. 7. However, the present invention is not limited to this embodiment. For example, the master controller 1 may make each of the determinations in Steps S10 through S30 of FIG. 7.

When the master controller 1 makes each of the determinations in Steps S10 through S30 of FIG. 7, the master controller 1 may send a learning capacity request command to a BMU 5 corresponding to the assembled battery 7 targeted for the capacity learning process via the PCS management control unit 3 in communication with the BMU 5 corresponding to the assembled battery 7 targeted for the capacity learning process.

KEY TO THE DRAWINGS

1: Master Controller
2: PCS
3: PCS Management Control Unit
4: BSU
5: BMU
6: Master BMU
7: Assembled Battery
100: Load
200: Power Grid
601: Control Unit 602: Optical Communication Unit
603: Communication Interface
700: Battery Pack
701: Rechargeable Battery Cell
702: Battery State Detection Unit
703: Control Unit
704: Optical Communication Unit
705: Discharge Unit

What is claimed is:

1. A control system for an assembled battery provided with an assembled battery having a plurality of rechargeable battery packs connected in series, and a control unit for controlling the assembled battery,
the control system for an assembled battery characterized in that
the battery packs have a discharge unit, and
the control unit
confirms the open-circuit voltage of each battery pack in the assembled battery after the assembled battery has been fully charged,
determines a target voltage on the basis of the open-circuit voltage confirmation results for each battery pack in the assembled battery,
causes the discharge unit to discharge each battery pack in the assembled battery that has an open-circuit voltage greater than the target voltage, until each of said open-circuit voltages has reached the target voltage,
fully charges the assembled battery once again, discharges the assembled battery until a first predetermined level has been reached, and learns the capacity of each battery pack in the assembled battery.

2. The control system for an assembled battery according to claim 1, wherein the target voltage is set to a voltage less than the maximum value of the open-circuit voltage of the battery packs inside the assembled battery, and equal to or greater than the minimum value of the open-circuit voltage of the battery packs inside the assembled battery.

3. The control system for an assembled battery according to claim 2, wherein the target value is set to the minimum value of the open-circuit voltage of the battery packs inside the assembled battery.

4. The control system for an assembled battery according to claim 1, wherein the assembled battery and the control unit communicate using an optical line.

5. The control system for an assembled battery according to claim 1, wherein the control unit disconnects the assembled battery from a power line while causing the discharge units to discharge each battery pack in the assembled battery that has an open-circuit voltage greater than the target voltage until the open-circuit voltage has reached the target voltage.

6. The control system for an assembled battery according to claim 1, wherein the control unit, after learning the capacity of each battery pack inside the assembled battery, charges the assembled battery to a second predetermined level having a greater accumulated charge than the first predetermined level.

7. A power supply system characterized in that it is provided with the control system for an assembled battery according to claim 1 and a plurality of assembled batteries having the control system for the assembled battery, the plurality of assembled batteries being connected in parallel.

* * * * *